No. 777,457. Patented December 13, 1904.

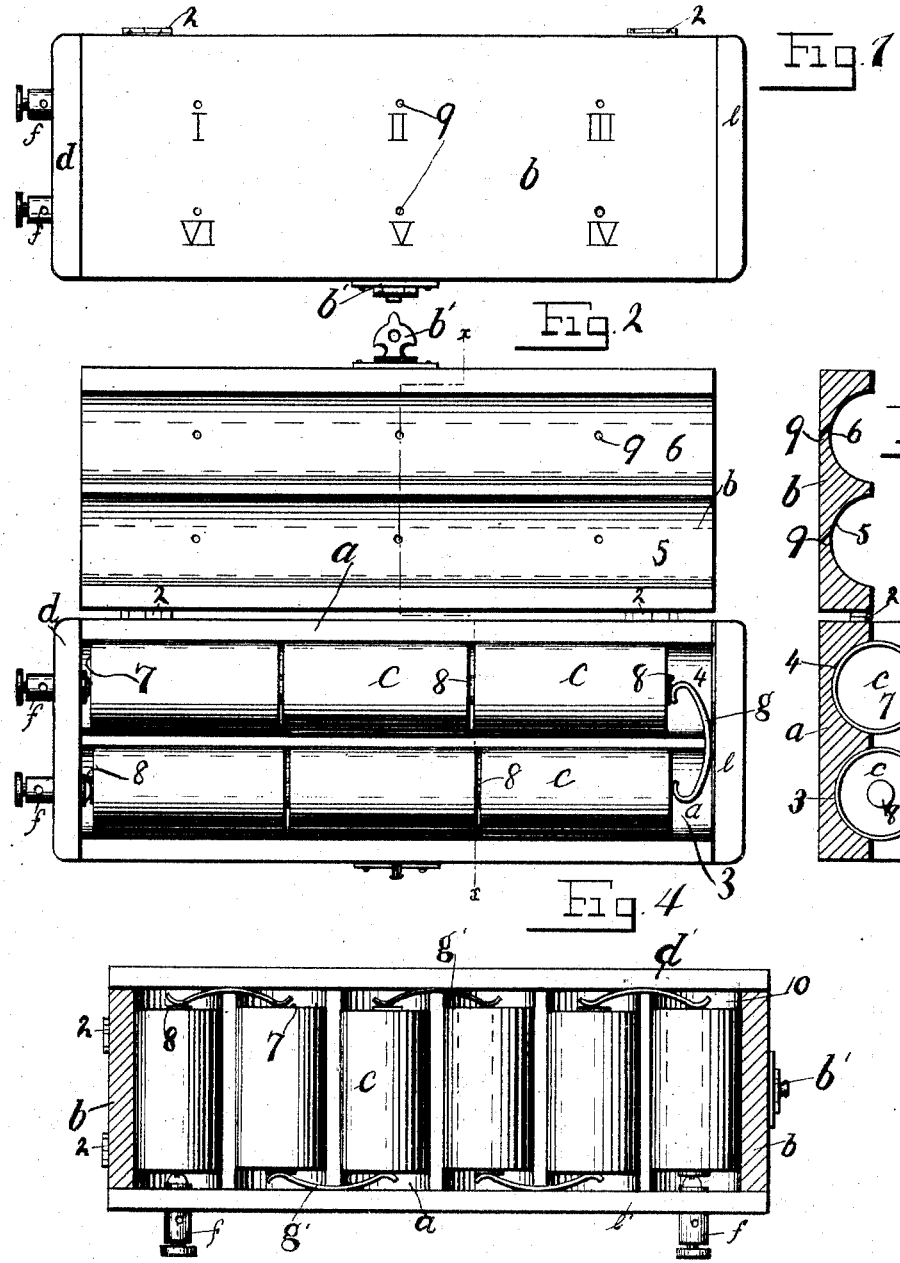

UNITED STATES PATENT OFFICE.

REINHOLD H. WAPPLER AND FREDERICK H. WAPPLER, OF NEW YORK, N. Y.

BATTERY-CASE.

SPECIFICATION forming part of Letters Patent No. 777,457, dated December 13, 1904.

Application filed April 20, 1904. Serial No. 204,046. (No model.)

*To all whom it may concern:*

Be it known that we, REINHOLD H. WAPPLER and FREDERICK H. WAPPLER, citizens of the United States, residing in the borough of Manhattan, city, county, and State of New York, have invented an Improvement in Battery-Cases, of which the following is a specification.

Our invention relates particularly to a convenient and compact form of battery-case for the use of physicians, surgeons, and others, and comprises a case constructed to receive and when closed to hold in place the plurality of cells of the battery.

In carrying out our invention we employ a base and a cover therefor, which members are practically counterparts of one another, both being provided with series of parallel and corresponding grooves or recesses adapted to receive the battery-cells and when closed down one upon the other to retain the same. The base and the cover are to be connected in any desired manner, preferably by hinges and a catch. We employ parts in connection with the case secured to the base and forming therewith a unitary structure and between which the cover member is received, and the parts of the base and cover to which the securing devices are attached are intermediate of said parts. We also employ suitable terminals secured to the case and means for maintaining the battery-cells in position within the case and for insuring the proper electrical connections between the same.

In the drawings, Figure 1 is a plan of our improved battery-case. Fig. 2 is a similar view with the cover member opened. Fig. 3 is a sectional view on line $x$ $x$, Fig. 2. Fig. 4 is a plan and partial section through the cover of a modified form of our invention, the part of the cover above the section being entirely removed.

$a$ represents the base, made of wood or other suitable material and preferably rectangular. $b$ represents the cover, made of the same material as the base and corresponding to the same in outline. These members are preferably connected together at one edge by means of hinges 2 or otherwise. The base $a$ is provided with approximately parallel substantially semicircular recesses 3 4 and the cover $b$ with alining and corresponding recesses 5 6, which recesses when the cover $b$ is superimposed upon the base $a$ are adapted to receive the cells $c$ of a dry or other battery, and the base and cover may be fastened in position relative to one another by means of a catch $b'$.

In the preferred form of our invention (shown in Figs. 1, 2, and 3) we provide parts $d$ $e$, secured to the base $a$ at the opposite ends thereof and which parts conform in cross-section with that of the combined base and cover, so that the cover $b$ in closing the case fits down between the projecting portions of the parts $d$ and $e$, in the former of which we secure suitable binding-posts $f$ to receive the ends of circuit-wires. As will be seen by reference to Fig. 2, the cells $c$ are placed in the longitudinal grooves 3 4 in the base in such a manner that one binding-post is electrically connected to the zinc 7 of one cell and the other binding-post to the carbon member 8 of another cell, and a spring $g$ or other suitable means is employed at the opposite end of the case to force the cells together to maintain them in position and provide the necessary electrical connection from the cells in one groove to those in the adjacent groove. The cells are necessarily laid endwise the zinc and adjacent carbon in contact. We also prefer to provide the cover $b$ of the casing with a plurality of holes 9, passing through the same at an inclination, each one of which is so placed as to come directly above the zinc of a given cell in the battery in order that a circuit-wire by being passed through one of the holes may contact with the zinc member of the cell corresponding with the hole through which the wire is passed, as it may oftentimes be necessary as well as desirable to employ a smaller current than that furnished by the entire battery. On the outer surface of the cover the holes 9 are numbered consecutively and in order according to the arrangement and number of the cells, so that in use, if desired, a record may be kept of the cells as used—as, for instance, the terminals of the circuit-wires may be placed in the holes 2 and 5 and the current used from the cells of these and the intermediate numbers.

As shown in Fig. 4, we may provide the base and cover with series of parallel and corresponding transverse grooves or recesses 10, each one of which is adapted to receive a single cell of the battery. In this structure the parts $d'$ $e'$, corresponding, respectively, with the parts $d$ $e$ of the preferred structure, are secured to the base at the sides instead of at the ends thereof, which necessitates the cover being hinged and latched at the ends instead of at the sides. In the modified structure we employ springs $g'$ or other suitable means at opposite ends of the cells for maintaining the cells of the battery in position and at the same time providing the necessary electrical connections for coupling up the cells.

We claim as our invention—

1. A battery-case, comprising a base and a cover therefor both having series of alining and corresponding grooves for receiving the battery-cells, means for connecting the cover to the base, parts secured to the base and between which the cover at opposite edges is received, and which means are intermediate of the aforesaid parts, terminals secured to the case, and means for completing the electric circuit between the cells and to the terminals.

2. A battery-case, comprising a base and a cover therefor, both having series of grooves in corresponding positions, ends secured to said base and corresponding in outline with that of the base and cover when superimposed, and electric terminals secured in one of said ends.

3. A battery-case, comprising a base and a cover therefor, both having series of grooves in corresponding positions, means for connecting the base and cover together at one side, means for locking said parts together when superimposed at the other side, ends secured to said base and corresponding in outline to that of the base and cover when superimposed, and electrical terminals secured in one of said ends.

4. A battery-case, comprising a base and a cover therefor, both having series of grooves in corresponding positions adapted to receive the cells of a battery, ends secured to said base and corresponding in outline to that of the base and cover when superimposed, means for electrically connecting the cells in the different grooves in the case and for maintaining the cells in position therein, and electric terminals secured in one of said ends.

5. A battery-case, comprising a base and a cover therefor, both having two longitudinal grooves in corresponding positions adapted to receive the cells of the battery, hinges connecting the said base and cover, a latch at the side opposite the hinges, ends secured to the said base and corresponding in outline with that of the base and cover when superimposed, a spring for electrically connecting the cells in the two grooves and for maintaining the same in position therein, and electrical terminals secured in one of said ends.

6. A battery-case, comprising a base and a cover therefor both having series of alining and corresponding grooves for receiving the battery-cells, means for connecting the cover to the base, parts secured to the base and between which the cover at opposite edges is received, and which means are intermediate of the aforesaid parts, terminals secured to the case, the cover being provided with holes therethrough numbered consecutively and in order according to the arrangement and number of the cells and placed at an inclination over the cells, substantially as specified.

Signed by us this 6th day of April, 1904.

REINHOLD H. WAPPLER.
FREDERICK H. WAPPLER.

Witnesses:
GEO. T. PINCKNEY,
BERTHA M. ALLEN.